US008558836B2

(12) United States Patent
Mantor et al.

(10) Patent No.: US 8,558,836 B2
(45) Date of Patent: *Oct. 15, 2013

(54) SCALABLE AND UNIFIED COMPUTE SYSTEM

(75) Inventors: Michael J. Mantor, Orlando, FL (US); Jeffrey T. Brady, Orlando, FL (US); Mark C. Fowler, Hopkinton, MA (US); Marcos P. Zini, Oviedo, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 851 days.

This patent is subject to a terminal disclaimer.

(21) Appl. No.: 12/476,161

(22) Filed: Jun. 1, 2009

(65) Prior Publication Data
US 2009/0295821 A1 Dec. 3, 2009

Related U.S. Application Data

(60) Provisional application No. 61/057,483, filed on May 30, 2008, provisional application No. 61/057,504, filed on May 30, 2008, provisional application No. 61/057,492, filed on May 30, 2008, provisional application No. 61/057,499, filed on May 30, 2008, provisional application No. 61/057,513, filed on May 30, 2008.

(51) Int. Cl.
G06T 15/50 (2011.01)
(52) U.S. Cl.
USPC .......................................... 345/426
(58) Field of Classification Search
USPC .......................................... 345/426
See application file for complete search history.

(56) References Cited

U.S. PATENT DOCUMENTS

| 5,224,208 A | 6/1993 | Miller, Jr. et al. |
| 6,104,415 A | 8/2000 | Gossett |
| 6,157,384 A | 12/2000 | Oka et al. |

(Continued)

FOREIGN PATENT DOCUMENTS

| CN | 1183154 A | 5/1998 |
| CN | 1329329 A | 1/2002 |

OTHER PUBLICATIONS

Search Report and Written Opinion for International Application No. PCT/US09/03316 mailed Jul. 17, 2009, 7 pages.

(Continued)

Primary Examiner — James A Thompson
Assistant Examiner — Peter Hoang
(74) Attorney, Agent, or Firm — Sterne, Kessler, Goldstein & Fox P.L.L.C.

(57) ABSTRACT

A Scalable and Unified Compute System performs scalable, repairable general purpose and graphics shading operations, memory load/store operations and texture filtering. A Scalable and Unified Compute. Unit Module comprises a shader pipe array, a texture mapping unit, and a level one texture cache system. It accepts ALU instructions, input/output instructions, and texture or memory requests for a specified set of pixels, vertices, primitives, surfaces, or general compute work items from a shader program and performs associated operations to compute the programmed output data. The texture mapping unit accepts source data addresses and instruction constants in order to fetch, format, and perform instructed filtering interpolations to generate formatted results based on the specific corresponding data stored in a level one texture cache system. The texture mapping unit consists of an address generating system, a pre-formatter module, interpolator module, accumulator module and a format module.

20 Claims, 4 Drawing Sheets

(56) References Cited

U.S. PATENT DOCUMENTS

| | | |
|---|---|---|
| 6,326,964 B1 | 12/2001 | Snyder et al. |
| 6,731,303 B1 | 5/2004 | Marino |
| 6,897,871 B1 | 5/2005 | Morein et al. |
| 7,136,068 B1 | 11/2006 | Priem et al. |
| 7,164,426 B1 | 1/2007 | Duluk et al. |
| 7,330,188 B1 | 2/2008 | Solanki et al. |
| 7,589,741 B1 | 9/2009 | Donham et al. |
| 7,928,990 B2 | 4/2011 | Jiao et al. |
| 7,936,359 B2 | 5/2011 | Spangler et al. |
| 7,999,821 B1 | 8/2011 | Minkin |
| 8,195,882 B2 | 6/2012 | DeLaurier et al. |
| 2002/0050992 A1* | 5/2002 | Deering ................ 345/423 |
| 2004/0189652 A1 | 9/2004 | Emberling |
| 2006/0028482 A1 | 2/2006 | Donovan et al. |
| 2006/0174081 A1 | 8/2006 | Latta |
| 2006/0250409 A1 | 11/2006 | Bando et al. |
| 2007/0211070 A1 | 9/2007 | Stenson |
| 2008/0094405 A1 | 4/2008 | Bastos et al. |
| 2008/0094407 A1 | 4/2008 | Xu et al. |
| 2008/0094408 A1 | 4/2008 | Yin et al. |
| 2008/0284786 A1 | 11/2008 | Airey et al. |
| 2008/0303839 A1 | 12/2008 | Quennesson et al. |
| 2009/0295819 A1 | 12/2009 | Buchner et al. |
| 2009/0309896 A1 | 12/2009 | DeLaurier et al. |
| 2009/0315909 A1 | 12/2009 | DeLaurier et al. |
| 2010/0146211 A1 | 6/2010 | DeLaurier et al. |

OTHER PUBLICATIONS

Search Report and Written Opinion for International Application No. PCT/US09/03317 mailed Jul. 17, 2009, 6 pages.

Notice of Allowance mailed Jun. 27, 2012 for U.S. Appl. No. 12/130,364, filed May 30, 2008; 5 pages.

Non-Final Rejection mailed Jun. 13, 2012 for U.S. Appl. No. 12/476,202, filed Jun. 1, 2009; 23 pages.

Notice of Allowance mailed Aug. 23, 2012 for U.S. Appl. No. 12/130,364, filed May 30, 2008; 5 pages.

Notice of Allowance mailed Jan. 4, 2013 for U.S. Appl. No. 12/130,364, filed May 30, 2008; 5 pages.

Final Rejection mailed Jul. 23, 2012, for U.S. Appl. No. 12/476,152, filed Jun. 1, 2009; 16 pages.

Non-Final Rejection mailed Aug. 24, 2011 for U.S. Appl. No. 12/476,159, filed Jun. 1, 2006; 15 pages.

Final Rejection mailed Feb. 6, 2012 for U.S. Appl. No. 12/476,159, filed Jun. 1, 2006; 9 pages.

Notice of Allowance mailed Apr. 2, 2012 for U.S. Appl. No. 12/476,159, filed Jun. 1, 2006; 8 pages.

U.S. Appl. No. 13/618,725, Buchner et al., "Floating Point Texture Filtering Using Unsigned Linear Interpolators and Block Normalization," filed Sep. 14, 2012.

Office Action mailed Nov. 1, 2011 in U.S. Appl. No. 12/130,364, Buchner, B. et al., filed May 30, 2008.

Office Action mailed Mar. 14, 2012 in U.S. Appl. No. 12/130,364, Buchner, B. et al., filed May 30, 2008.

Office Action mailed Mar. 26, 2012 in U.S. Appl. No. 12/476,152, DeLaurier, A. et al., filed Jun. 1, 2009.

First Office Action (with English-Language Translation) directed to related Chinese Patent Application No. 200980119829.0, mailed Oct. 9, 2012; 24 pages.

Second Office Action (with English-Language Translation) directed to Chinese Patent Application No. 200980119829.0, mailed May 15, 2013; 19 pages.

* cited by examiner

SCALABLE AND UNIFIED COMPUTE SYSTEM

CROSS REFERENCE TO RELATED APPLICATIONS

This application claims the benefit under 35 U.S.C. §119(e) to U.S. Provisional Patent Application No. 61/057,483 filed May 30, 2008; U.S. Provisional Patent Application No. 61/057,504 filed May 30, 2008; U.S. Provisional Patent Application No. 61/057,492 filed May 30, 2008; U.S. Provisional Patent Application No. 61/057,499 filed May 30, 2008; and U.S. Provisional Patent Application No. 61/057,513 filed May 30, 2008, all of which are incorporated by reference herein in their entireties.

BACKGROUND

1. Field of the Invention

The present invention generally relates to computing operations performed by computing systems, and more particularly to graphics processing tasks performed by computing systems.

2. Related Art

A graphics processing unit (GPU) is a complex integrated circuit that is specially configured to carry out graphics processing tasks. A GPU can, for example, execute graphics processing tasks required by an end-user application, such as a video game application. For such applications, for example, there are several layers of software between the end-user application and the GPU.

The end-user application communicates with an application programming interface (API). An API allows the end-user application to output graphics data and commands in a standardized format, rather than in a format that is dependent on the GPU. Several types of APIs are commercially available, including DirectX® developed by Microsoft Corp. and OpenGL® developed by Silicon Graphics, Inc. The API communicates with a driver. The driver translates standard code received from the API into a native format of instructions understood by the GPU. The driver is typically written by the manufacturer of the GPU. The GPU then executes instructions from the driver.

A GPU produces, by carrying out a process known as "rendering" creates individual pixels that together form an image based on a higher level description of image components. A GPU typically carries out continuous rendering using pipelines to process pixel, texture, and geometric data. These pipelines are often referred to as a collection of fixed function special purpose pipelines such as rasterizers, setup engines, color blenders, hieratical depth, texture mapping and programmable stages that can be accomplished in shader pipes or shader pipelines, "shader" being a term in computer graphics referring to a set of software instructions used by a graphic resource primarily to perform rendering effects. In addition, GPU's can also employ multiple programmable pipelines in a parallel processing design to obtain higher throughput. A multiple of shader pipelines can also be referred to as a shader pipe array.

As a shader pipe array performs its ongoing rendering process, manufacturing defects in a pipeline can be become known and subsequent failures can occur within a pipeline. A small defect or failure in a system without any logic repair is fatal and can render the device defective.

In addition, GPUs also support texture mapping. Texture mapping is a process used to determine the texture color for a texture mapped pixel through the use of the colors of nearby pixels of the texture, or texels. The process is also referred to as texture smoothing or texture interpolation. However, high image quality texture mapping requires a high degree of computational complexity.

Given the ever increasing complexity of new software applications and API shader language advancements, the demands on GPUs to provide high quality rendering, texture mapping and generalize memory access for advanced rendering and generalized compute, computation complexities are further increasing.

In addition, GPUs equipped with a Unified Shader also simultaneously support many types of shader processing, from pixel, vertex, primitive, surface and generalized compute are raising the demand for higher performance generalized memory access capabilities.

What are needed, therefore, are systems and/or methods to alleviate the aforementioned deficiencies. Particularly, what is needed is a scalable Unified Shader design approach for a shader pipe with a multipurpose texture mapping system capable of generalized load/store operations with the ability to overcome the effects of a defective internal subcircuit with minimal impact on overall system performance.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

Consistent with the principles of the present invention as embodied and broadly described herein, the present invention includes method and apparatus related to a row based Scalable and Unified Compute Unit Module. The Scalable and Unified Compute Unit Module includes a shader pipe array and texture mapping unit with a level one cache system to perform texture mapping and general load/store accesses with the ability to process shader pipe data destined to a defective shader pipe. The Scalable and Unified Compute System comprises a sequencer, Scalable and Unified Compute Unit Module with access to a level two texture cache system and thus an external memory system. The Scalable and Unified Compute System is configured to accept an executing shader program instruction including input, output, ALU and texture or general memory load/store requests with address data from the shader pipes and program constants to generate the return texel or memory data based on state data controlling the pipelined address and filtering operations for a specific pixel or thread. The texture filter system is configured based on the shader program instruction and constant to generate a formatted interpolation based on texel data stored in the cache system for the addresses stored in the shader pipeline.

In an embodiment of the invention, the row based shader pipe Scalable and Unified Compute System further comprises a redundant shader pipe system. The redundant shader pipe system is configured to process shader pipe data destined to a defective shader pipes in the shader pipe array.

In another embodiment the row based Scalable and Unified Compute System further comprises a level two texture cache system. The level two texture cache system can be read and written to by any level one row based texture cache system.

In another embodiment the texture filter in the texture mapping unit in the Scalable and Unified Compute Unit Module further comprises a pre-formatter module, an interpolator module, an accumulator module, and a format module. The pre-formatter module is configured to receive texel data and convert it to a normalized fixed point format. The interpolator module is configured to perform an interpolation on the normalized fixed point texel data from the pre-formatter module and generate re-normalized floating point texel data. The accumulator module is configured to accumulate floating point texel data from the interpolator module to achieve the desired level of bilinear, trilinear, and anisotropic filtering. The format module is configured to convert texel data from the accumulator module into a standard floating point representation.

Further features and advantages of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated in and constitute part of the specification, illustrate embodiments of the invention and, together with the general description given above and the detailed description of the embodiment given below, serve to explain the principles of the present invention. In the drawings.

Figure 1:
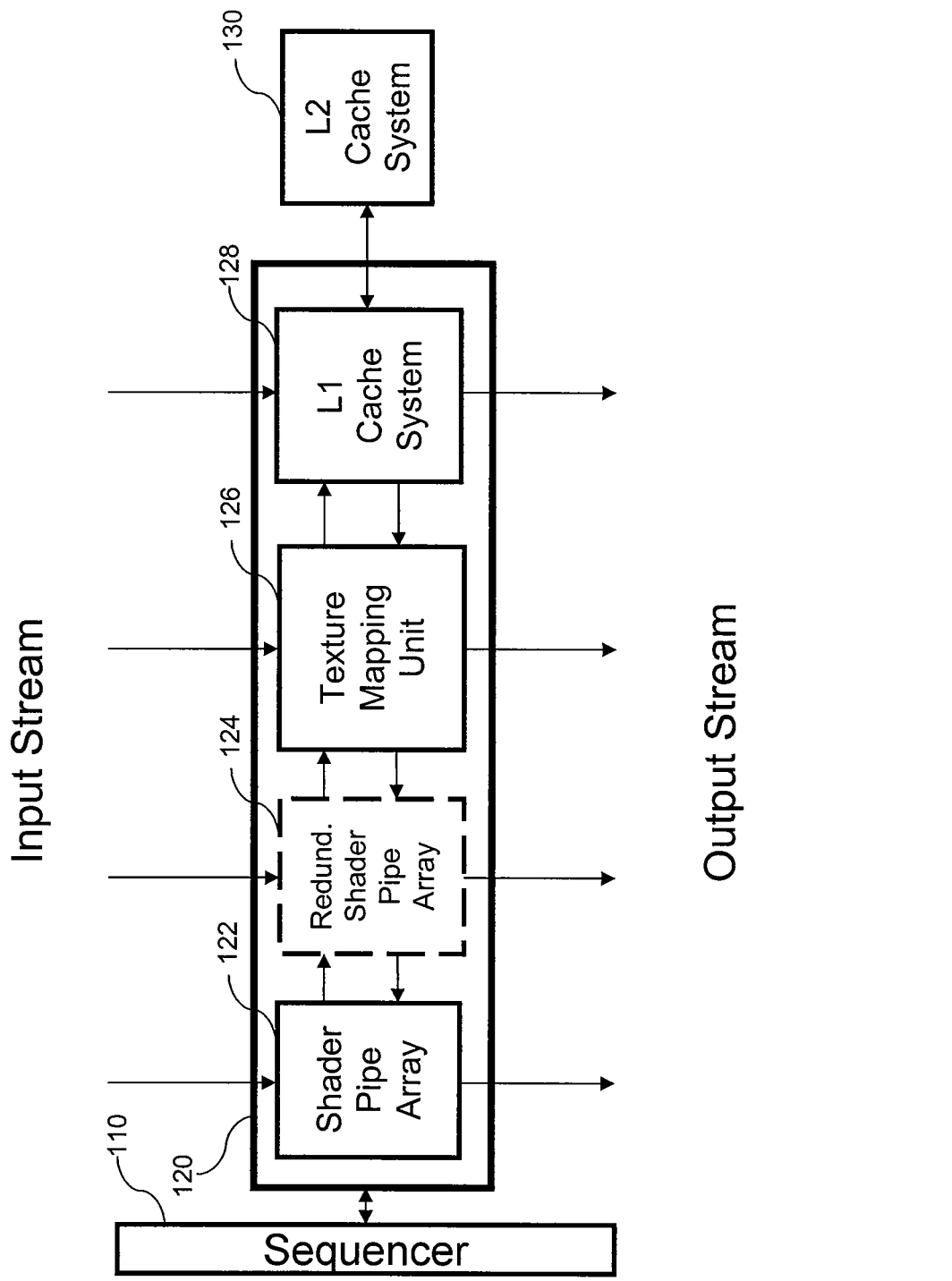
FIG. 1 is a system diagram depicting an implementation of a Scalable and Unified Compute System.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The invention will be better understood from the following descriptions of various "embodiments" of the invention. Thus, specific "embodiments" are views of the invention, but each is not the whole invention. In one respect, the invention relates to a Scalable and Unified Compute System whereby a shader pipe array processes shader program instructions on input pixel, vertex, and primitive, surface or compute work items to create output data for each item using generated texel data or memory load/store operations. In embodiments of this invention, bilinear texture mapping, trilinear texture mapping, and anisotropic texture mapping are applied to the texel data that is stored in a multi-level cache system. In another embodiment, a redundant shader system can be added and configured to process shader pipe data directed to defective shader pipes within the shader pipe array to recover devices with a defective sub-circuit in one or more shader pipes.

Embodiments of this invention that have configurations containing two or more Scalable and Unified Compute Systems, a subset of the Unified Compute Unit System itself can be configured to be a repairable unit. In such an embodiment workloads destined to a defective Unified Compute Unit System will instead be sent to a redundant Unified Compute Unit System to process all ALU, texture, and memory operations. This increases the portion of the device that is covered by repair significantly due to the inclusion of texture mapping unit and L1 cache system and thus significantly improves on the yield of such a device.

While specific configurations, arrangements, and steps are discussed, it should be understood that this is done for illustrative purposes only. A person skilled in the pertinent art(s) will recognize that other configurations, arrangements, and steps can be used without departing from the spirit and scope of the present invention. It will be apparent to a person skilled in the pertinent art(s) that this invention can also be employed in a variety of other applications.

It is noted that references in the specification to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic in connection with other embodiments whether or not explicitly described.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

FIG. 1 is an illustration of a Scalable and Unified Compute System 100 according to an embodiment of the present invention. System 100 comprises a sequencer 110, a Scalable and Unified Compute Unit Module 120, and a level two cache system 130. Scalable and Unified Compute Unit Module 120 comprises a shader pipe array 122, optional redundant shader pipe array 124, texture mapping unit 126, and level one texture cache system 128.

Shader pipe array 122 performs ALU operations on input data. Sequencer 110 controls the shader program instruction issue for contained workloads and the flow of data through shader pipe array 122. In addition, in an embodiment where the redundant shader pipe array 124 is present, sequencer 110 reacts to defective shader pipes that occur within shader pipe array 122 by scheduling instructions to the appropriate redundant units.

Sequencer 110 can issue a texture fetch or load/store operation that will initiate shader pipe array 122 to send addresses with the instruction issued to texture mapping unit 126. In this instance texture mapping unit 126 generates appropriate addresses to the level one texture cache system 128 that contains texel data or memory data associated with the addresses. Level one cache system 128, after receiving the addresses, will return the associated texel or memory data to texture mapping unit 126. When the requested texel or memory data is not present in the level one cache system 128, then the request is forwarded to a level two cache system 130 obtain and return the requested texel data.

Figure 2:
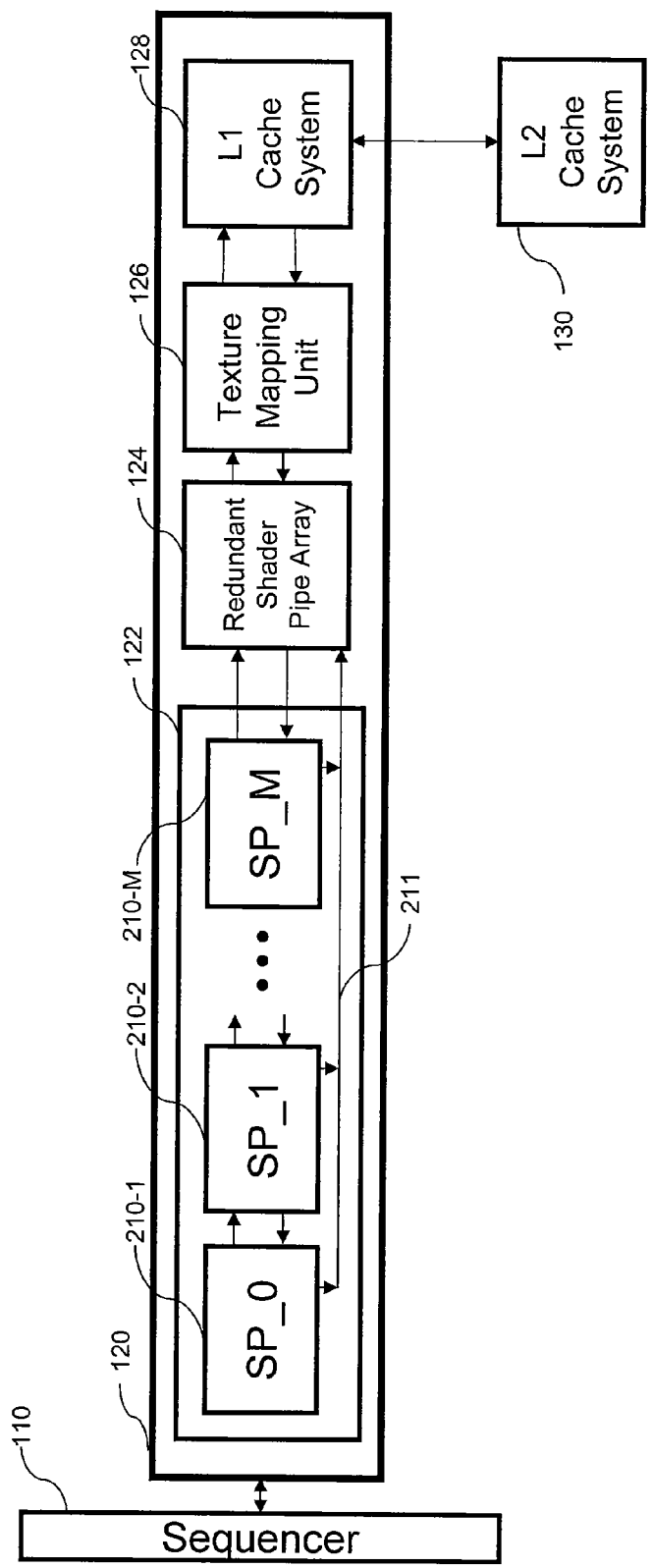
FIG. 2 is a system diagram depicting an implementation of a Scalable and Unified Compute System illustrating the details of the shader pipe array.

FIG. 2 is an illustration of a Scalable and Unified Compute Unit Module 120 including a more detailed view of the shader pipe array 122 according to an embodiment of the present invention. In this embodiment, shader pipe array 122 comprises one or more shader pipe blocks, here represented as SP_0 through SP_M, where "M" represents a positive integer greater than one.

In an embodiment where redundant shader pipe array 124 is present, if sequencer 110 identifies, as an example, that the shader pipe located in shader pipe block SP_1 is defective, then the shader pipe data destined to the defective pipe would be sent to redundant shader pipe array 124 via the input stream by the input module and processed by redundant shader pipe array 124. All texture mapping requests would be intercepted by redundant shader pipe array 124 when instructed via horizontal control path 211 from sequencer 110. Once redundant shader pipe array 124 processes the shader pipe data initially destined to the defective shader pipe, the processed redundant shader pipe array 124 data would be transferred from redundant shader pipe array 124 back to the output stream of shader pipe 122 and realigned in an output unit (not shown).

In an embodiment, redundant shader pipe array 124 consists of a single block, and therefore can only process shader pipe data destined to a single defective shader pipe at a time. In another embodiment wherein redundant shader pipe array 124 comprises multiple redundant shader blocks, then redundant shader pipe array 124 can process shader pipe data destined to more than one defective shader pipe simultaneously.

Figure 3:
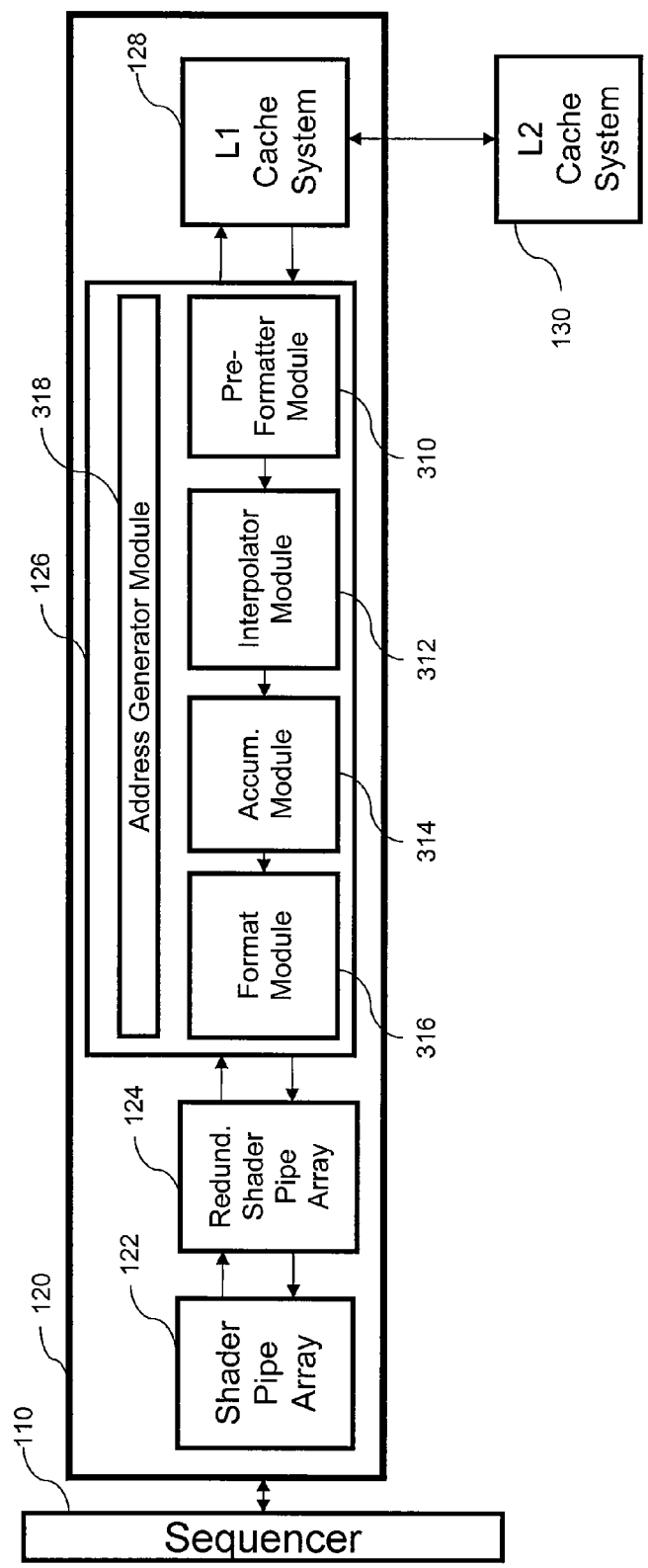
FIG. 3 is a system diagram depicting an implementation of a Scalable and Unified Compute System illustrating the details of the texture mapping unit.

FIG. 3 illustrates a more detailed view of texture mapping unit 126 according to an embodiment of the present invention. In this embodiment, shader pipe array 122 generates a texture or memory load/store request to texture mapping unit 126 that comprises an address generator system 318, a pre-formatter module 310, an interpolator module 312, an accumulator module 314, and a format module 316. The texture mapping unit 126 receives a request from shader arrays 122 and 124 and sequencer 110 respectively, and processes the instruction in address generator system 318 to determine the actual addresses to service. Resulting texel data received from the level one texture cache system 128 and, after the data is processed in pre-formatter module 310, interpolator module 312, accumulator module 314, and format module 316. The resultant texel data is sent back to the requesting resource in shader pipe array 122 and/or redundant shader pipe array 124. Pre-formatter module 310 is configured to receive texel data and perform a block normalization thereby generating normalized fixed point texel data. Interpolator module 312 receives the normalized fixed point texel data from pre-formatter module 310 and performs one or more interpolations, each of that are accumulated in accumulator module 314, to achieve the desired level of bilinear, trilinear, and anisotropic texture mapping. Format module 316 converts the accumulated texel data in accumulator module 314 to a standard floating point representation for the requesting resource, shader pipe array 122. For general load/store data pre-formatter module 310, interpolator module 312, accumulator module 314, and format module 316 pass the requested return data unmodified.

An embodiment represented by FIG. 3 also illustrates the use of a level two cache system 130. The level two cache system is additional memory that is available to Scalable and Unified Computer Unit Module 120 when it is necessary or desirable to read and/or write data from and to the level one cache system 128.

Figure 4:
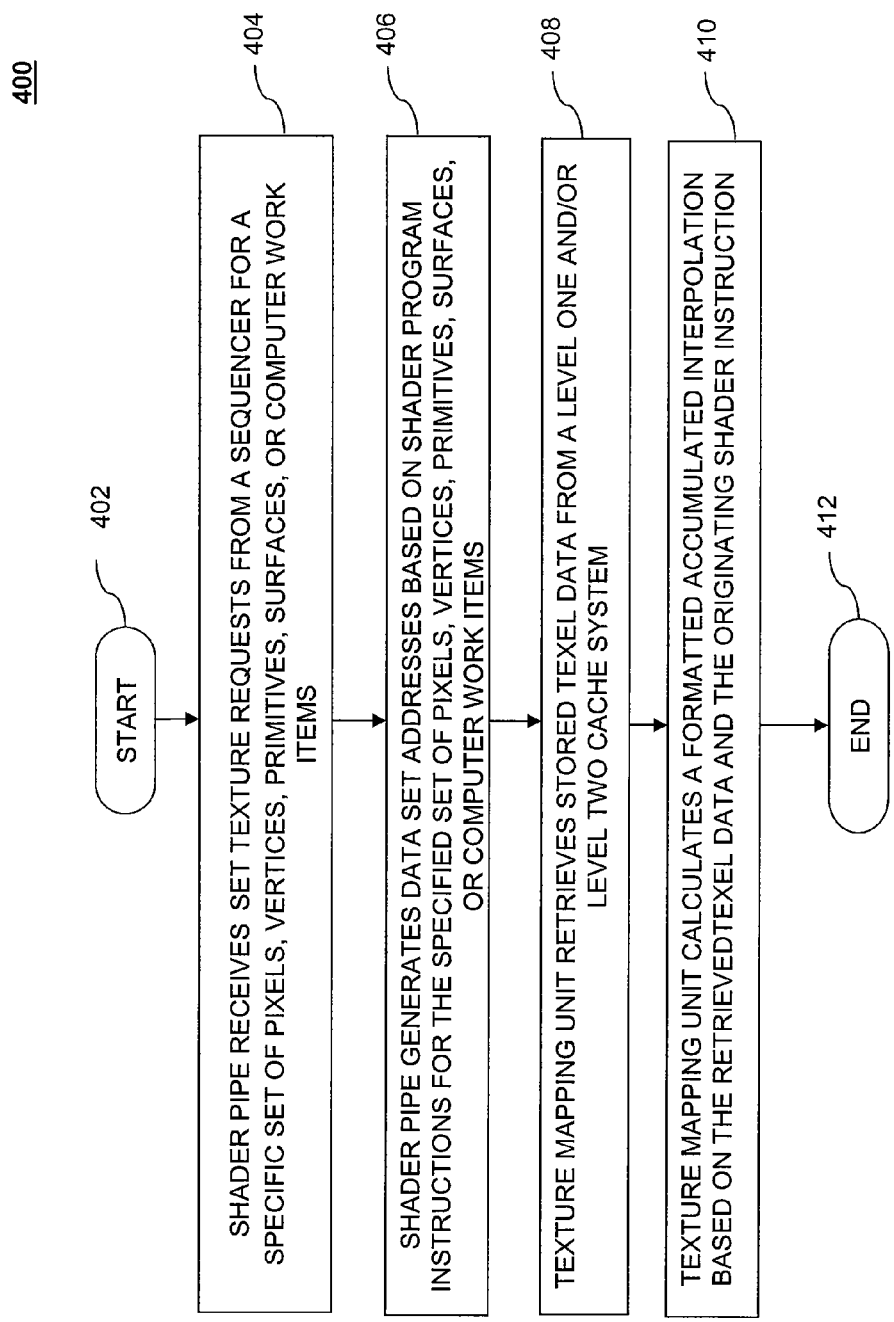
FIG. 4 is a flowchart depicting an implementation of a method for a Scalable and Unified Compute System.

FIG. 4 is a flowchart depicting a method 400 for texture mapping using a Scalable and Unified Compute System. Method 400 begins at step 402. In step 404, a shader pipe receives set texture requests from a sequencer for a specific set of pixels, vertices, primitives, surfaces, or computer work items. In step 406 the shader pipe generates data set addresses based on shader program instructions for the specified set of pixels, vertices, primitives, surfaces, or compute work items. In step 408, a texture mapping unit retrieved stored texel data from a level one and/or level two texture cache system. Moreover, in step 410 the texture mapping unit calculates a formatted accumulated interpolation based on the retrieved texel data and the originating shader instruction. Method 400 ends at step 412.

The functions, processes, systems, and methods outlined in FIGS. 1, 2, 3, and 4 can be implemented in software, firmware, or hardware, or using any combination thereof. If programmable logic is used, such logic can execute on a commercially available processing platform or a special purpose device.

As would be apparent to one skilled in the relevant art, based on the description herein, embodiments of the present invention can be designed in software using a hardware description language (HDL) such as, for example, Verilog or VHDL. The HDL-design can model the behavior of an electronic system, where the design can be synthesized and ultimately fabricated into a hardware device. In addition, the HDL-design can be stored in a computer product and loaded into a computer system prior to hardware manufacture.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodi-

What is claimed is:

1. An apparatus, comprising:
a hardware-based shader pipe array configured to accept texture instructions for a specified set of pixels, vertices, primitives, surfaces, or compute work items and to generate output data;
a hardware-based level one texture cache system configured to store the texture output data; and
a hardware-based texture mapping unit configured to:
retrieve texture output data from the level one texture cache system and generate formatted accumulated interpolation data, wherein
the texture mapping unit further comprises:
a pre-formatter module configured to accept texel data and generate normalized fixed point texel data;
an interpolator module configured to perform an interpolation on the normalized fixed point texel data from the pre-formatter module and generate re-normalized floating point texel data;
an accumulator module configured to accumulate floating point texel data from the interpolator module; and
a format module configured to convert texel data from the accumulator module into a standard floating point representation.

2. The apparatus of claim 1, wherein the shader pipe array is configured to accept ALU, load/store, and output instructions.

3. The apparatus of claim 1, further comprising a redundant shader pipe array configured to process shader pipe data destined for a defective shader pipe of the shader pipe array.

4. The apparatus of claim 1, wherein the shader pipe array comprises a shader pipe block.

5. The apparatus of claim 4, wherein the shader pipe block is configured to contain one or more shader pipes.

6. The apparatus of claim 1, wherein the level one texture cache system is configured to read and write to a level two cache system.

7. The apparatus of claim 1, wherein the interpolator module is configured to perform one or more interpolations in order to achieve at least one of:
a bilinear texture filtering;
a trilinear texture filtering; and
an anisotropic texture filtering.

8. A method for computing, comprising:
receiving, using a processor, a set of texture requests for a specified set of pixels, vertices, primitives, surfaces, or compute work items;
generating, using the processor, a data set of addresses based on a shader program instruction for the specified set of pixels, vertices, primitives, surfaces, or compute work items;
retrieving, using the processor, stored texel data from a level one cache system; and
calculating, using the processor, a formatted accumulated interpolation based on the retrieved texel data and an originating shader instruction, further comprising:
receiving floating point texel data;
generating normalized fixed point texel data from the floating point texel data;
performing an interpolation on the normalized fixed point texel data;
generating re-normalized floating point texel data;
accumulating re-normalized texel data; and
formatting the accumulated re-normalized texel data into a standard floating point representation.

9. The computing method of claim 8, further comprising:
processing shader pipe data destined for a defective shader pipe.

10. The computing method of claim 8, further comprising:
reading from and writing to a level two cache system from the level one texture cache system.

11. The computing method of claim 8, wherein the interpolation further comprises:
bilinear texture filtering;
trilinear texture filtering; and
anisotropic texture filtering.

12. The computing method of claim 8, wherein the method is performed by synthesizing hardware description language instructions.

13. A system for computing system, comprising:
a processor; and
a memory, in communication with the processor, configured to store a plurality of processing instructions for directing a computing system to:
receive a set of texture requests for a specified set of pixels, vertices, primitives, surfaces, or compute work items;
generate a data set of addresses based on a shader program instruction for the specified set of pixels, vertices, primitives, surfaces, or compute work items;
retrieve stored texel data from a level one cache system; and
calculate a formatted accumulated interpolation based on the retrieved texel data and an originating shader instruction, further comprising instructions for causing the computing system to:
receive floating point texel data;
generate normalized fixed point texel data from the floating point texel data;
perform an interpolation on the normalized fixed point texel data;
generate re-normalized floating point texel data;
accumulate re-normalized texel data; and
format the accumulated re-normalized texel data into a standard floating point representation.

14. The computing system of claim 13, further comprising instructions for causing the computing system to:
process shader pipe data destined to a defective shader pipe.

15. The computing system of claim 13, further comprising instructions for causing the computing system to:
read and write to a level two cache system from the level one texture cache system.

16. The computing system of claim 13, further comprising instructions for causing the computing system to:
filter with a bilinear texture filter;
filter with a trilinear texture filter; and
filter with an anisotropic texture filter.

17. A non-transitory computer readable storage medium carrying one or more sequences of one or more instructions execution of which by one or more processor-based computing devices cause the one or more computing devices to perform a method of computing, the method performing operations comprising:
receiving a set of texture requests for a specified set of pixels, vertices, primitives, surfaces, or compute work items;
generating a data set of addresses based on a shader program instruction for the specified set of pixels, vertices, primitives, surfaces, or compute work items;
retrieving stored texel data from a level one cache system; and calculating a formatted accumulated interpolation based on the retrieved texel data and; an originating shader instruction, further comprising:
    receiving floating point texel data;
    generating normalized fixed point texel data from the floating point texel data;
    performing an interpolation on the normalized fixed point texel data generating re-normalized floating point texel data;
    accumulating re-normalized texel data; and
    formatting the accumulated re-normalized texel data into a standard floating point representation.

18. The non-transitory computer readable storage medium of claim 17, further comprising:
    reading from and writing to a level two cache system from the level one texture cache system.

19. The non-transitory computer readable storage medium of claim 17, further comprising:
    bilinear texture filtering;
    trilinear texture filtering; and
    anisotropic texture filtering.

20. The non-transitory computer readable storage medium of claim 17, further comprising;
    processing shader pipe data destined for a defective shader pipe.

* * * * *